United States Patent [19]

Warrach et al.

[11] Patent Number: 4,920,165

[45] Date of Patent: Apr. 24, 1990

[54] SCORCH RETARDER FOR HALOGENATED ELASTOMERS

[75] Inventors: Wolfgang Warrach, Cannonsburg; Mark S. Reed, Zelienpole, both of Pa.

[73] Assignee: Mobay Corporation, Pittsburgh, Pa.

[21] Appl. No.: 71,123

[22] Filed: Jul. 7, 1987

[51] Int. Cl.$^5$ ............................................. C08K 5/34
[52] U.S. Cl. ................................... 524/91; 524/100
[58] Field of Search ................................ 524/91, 100

[56] References Cited

U.S. PATENT DOCUMENTS

| | | | |
|---|---|---|---|
| 3,413,227 | 11/1968 | Howard et al. | 524/91 |
| 3,865,763 | 2/1975 | Feniak | 260/5 |
| 3,880,821 | 4/1975 | Feniak | 260/85.3 |
| 4,128,510 | 12/1978 | Richwine | 528/36 |
| 4,410,704 | 10/1983 | Kawaoka et al. | 548/166 |
| 4,569,958 | 2/1986 | Maeda et al. | 524/100 |
| 4,594,396 | 6/1986 | Berta | 525/352 |

FOREIGN PATENT DOCUMENTS 704113  2/1965  Canada ................ 524/100

*Primary Examiner*—John Kight, III
*Assistant Examiner*—Kriellion Morgan
*Attorney, Agent, or Firm*—Joseph C. Gil; Aron Preis

[57] ABSTRACT

In accordance with the present invention there is provided a vulcanizable halogenated butyl rubber compound having an improved degree of scorch resistance without causing unreasonably long cure time. The compound is characterized in that it comprises a retarder conforming structurally to

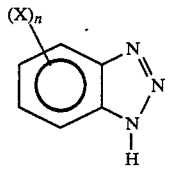

wherein
 X is a $C_1$–$C_6$ alkyl and
 n is an integer from 0 to 4.

The physical properties of the compound are substantially unchanged by the incorporation of the retarder.

11 Claims, No Drawings

SCORCH RETARDER FOR HALOGENATED ELASTOMERS

FIELD OF THE INVENTION

The invention relates to the stabilization of compounds based on halogenated elastomers including bromo butyl rubber and chloro butyl rubber; more specifically the invention relates to retarding the cure of these rubbers in order to prevent premature vulcanization (scorch).

BACKGROUND OF THE INVENTION

Halogenated elastomers, chloro and bromo butyl rubbers are widely used in the preparation of mechanical goods and of inner liners of tires. These rubbers are characterized by their excellent chemical resistance, and low gas permeability. A salient drawback of compounds based on these rubbers is their inherent susceptibility to premature vulcanization, i.e. scorching during processing and/or storage. Premature vulcanization causes the compounds to become tough and unworkable. Commonly used cure systems for these elastomers therefore include retarders.

In U.S. Pat. No. 3,865,763 certain boron compounds were disclosed to be effective by retarding the scorch of halogenated butyl rubbers. In U.S. Pat. No. 3,880,821 there were disclosed certain free acids or the magnesium, aluminum, calcium, and barium salts of an oligomer of linoleic acid to be suitable scorch retarding agents in halogenated butyl rubbers. In U.S. Pat. No. 4,128,510 it was disclosed that certain derivatives of 2,5-dimercapto-1,3,4-thiadiazole used in the presence of certain basic materials are suitable in promoting cross-linking without sticking or premature curing of certain saturated and unsaturated halogen containing polymers. These halogen containing polymers include chloro butyl rubber and bromo butyl rubber. U.S. Pat. No. 4,410,704 disclosed N-substituted benzothiazole-2-sulfonamide to be useful in preventing scorching in halogenated butyl rubbers. In U.S. Pat. No. 4,569,958 there were disclosed compounds containing halogenated butyl rubbers which have been rendered scorch resistant upon the addition of a di or tri-thiol-s-triazine compound and at least one carboxylic acid compound. A cure system used in crosslinking halogenated butyl rubbers disclosed in U.S. Pat. No. 4,514,396 uses a thiourea derivative as a crosslinking agent, an inorganic base as an acid exceptor and a thiuran sulfide as an accelerator.

In addition to the above, dibenzothiazyl disulfide (MBTS) tetramethylthiuran disulfide (TMTD) and N-cyclohexylbenzothiazyl-2-sulfenamide (CBS) have been disclosed to be useful as retardants. For instance, in a zinc oxide/sulfur cure system MBTS is often added. This system is not entirely satisfactory, especially for bromo butyl rubbers, because it results in an unfavorable cure rate and a reduction in the level of the mechanical properties after aging.

SUMMARY OF THE INVENTION

In accordance with the present invention there is provided a vulcanizable halogenated butyl rubber compound having an improved degree of scorch resistance without the accompanying unreasonably long cure time which is characterized in that it incorporates a retarder conforming structurally to

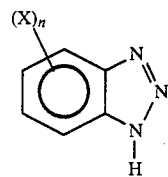

wherein
X denotes a $C_1$–$C_6$ alkyl and
n denotes an integer of from 0 to 4.

The retarder of the invention has no significant adverse effect on the physical properties of the elastomer.

DETAILED DESCRIPTION OF THE INVENTION

The term halogenated butyl rubber refers to a vulcanizable rubbery copolymer containing from about 85 to about 99.5% $C_4$–$C_8$ isoolefin and 0.5 to 15% conjugated $C_4$–$C_8$ diolefin. In particular, the halogenated rubber is a copolymer of isobutylene and isoprene prepared from about 99.5% to about 98.5% isobutylene and from about 1.5 to about 4.5% isoprene. The halogenation of the copolymers is carried out by well known processes and result in a halogenated content of about 0.5 to about 15 weight percent. Most preferably the halogenated rubber is a brominated or chlorinated butyl rubber containing from about 1.5 to 2.5 weight percent of bromine or chlorine. The retarder of the present invention conforms to

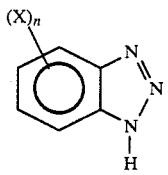

wherein
X is a $C_1$–$C_6$ alkyl radical and
n is an integer of from 0 to 4. Benzotriazole and tolyltriazole are the preferred species. The retarders are readily synthesized in accordance with known procedures.

The preferred vulcanization retarder of the present invention is a blend of 4- and 5-methylbenzotriazole (tolytriazole) conforming to the formula

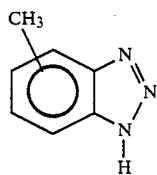

It is commercially available under the trademark Vulkalent ™ from Mobay Corporation and it is characterized in that its density is approximately 1.2. gm/cm³ and its melting point is about 181° F. (83° C.) It is further characterized in that it is soluble in acetone, ethyl acetate, ethanol, methylethylketone and methylene chloride and is sparingly soluble in toluene and insoluble in hexane and water. Tolyltriazole has been previously recognized as a prevulcanization retarder in sulfur modified polychloroprene rubbers. It is also effective in nitrile rubber compounds provided MBTS/sulfur curing systems are used.

The triazole of the invention is easily incorporated in rubber compounds. The addition of about 0.1 to 5.0, preferably 0.2 to 2 phr (parts per one hundred parts of rubber) of the triazole in 100 parts by weight of the elastomer was found to impart scorch safety to the compound. Significantly, rubber goods containing triazole were found to be generally color stable and to have their mechanical properties practically unaffected by the addition of the retarder.

EXAMPLES

Experimental

In evaluating the rubber compounds the following standards were used.

ML1+4' @ 100° C.—compound viscosity before vulcanization per ASTM D-1646.

MS5 @ 135° C. (min)—scorch resistance at 135° C. in minutes per ASTM D-1646.

RHEOMETER @ 177° C.—(per ASTM D-2084).

T2=time (minutes) until a 2 lb-in in rise from minimum.

T90=time (minutes) until the compound reaches 90% of total cure.

Physical properties per ASTM D-412.

Generally, a system should have high "MS5 @ 135° C." values, i.e. long time to premature vulcanization, along with a minimum change in its T90, Rheometer maximum torque and physical properties. The physical properties were determined using specimens which were cured under the noted conditions.

In the following experiments the noted additives are:

Carbon Black N-660—moderately reinforcing carbon black;

N-550—moderate to high reinforcing carbon black;

N-330 and N-339—highly reinforcing carbon black;

Sunpar 2280 is paraffinic oil—a plasticizer;

Maglite D—magnesium oxide;

Vulkacit DM/C—mercapto benzothiazole disulfide (MBTS);

Vultac 5—alkyl phenol disulfide;

Vulkalent TM—tolytriazole;

Vulkanox DDA—styrenated diphenyl amine;

DOP—di-octyl phthalate (a plasticizer);

Vulkacit Thiuram/C—tetramethyl thiuram disulfide TMTD; a cure accelerator;

Vulkacit MOZ/LG and Vulkacit MOZ/SG-2—(-morpholinothio) benzothiazole (MBS), a cure accelerator;

Sundex 8125—aromatic oil, used as a plasticizer.

Sunolite 240—an ozone protective wax;

Vulkanox 4020—N-(1,3-dimethylbutyl)N'-phenyl-p-phenylenediamine (an antiozonant);

Vulkanox HS/LG—2,2,4-trimethyl-1,2-dihydroquinoline (polymerized); an antioxidant;

Crystex (80%)—insoluble sulfur, a curing agent.

The tabulated amounts are in phr (per 100 parts of rubber).

In SBR compounds (styrene-butadiene copolymer rubber) the tolytriazole of the invention does slow the scorching but only when present at twice the level of the commonly used retarder—cyclohexyl-thio-phthalimide, CTP—and even then, at a much reduced effectiveness.

The compounds shown below also contained conventional, known additives as follows: Sundex 8125—16 phr; carbon black N-339—65 phr; zinc oxide—5 phr; stearic acid—2 phr; Sunolite 240—1 phr; Vulkanox 4020—2 phr and Vulkanox HS/LG—1.5 phr. None of these is believed to be critical in relation to the demonstrated relative efficacy of the retarders.

| FORMULATION | CONTROL | 1 | 2 |
|---|---|---|---|
| SBR | 100 | 100 | 100 |
| Insoluble Sulfur | 1.88 | 1.88 | 1.88 |
| MBS | 1.5 | 1.5 | 1.5 |
| Tolyltriazole | — | 1 | — |
| CTP | — | — | 0.5 |
| Properties | | | |
| ML1 + 4' @ 100° C. | 61 | 60 | 60 |
| MS5 @ 121° C. (min) | 76.8 | 83.2 | 147.2 |
| RHEOMETER @ 160° C. | | | |
| T2 (min) | 7.8 | 7.5 | 11.2 |
| T90 (min) | 19.0 | 18.6 | 24.2 |
| Torque, Min. (in-lb) | 10 | 10 | 9 |
| Torque, Max. (in-lb) | 69 | 63 | 64 |
| PHYSICAL PROPERTIES | | | |
| (Cured for 90 minutes at 160° C.) | | | |
| Hardness, Shore A | 70 | 67 | 68 |
| Tensile Strength, psi | 3110 | 3030 | 3135 |
| Elongation (%) | 510 | 585 | 545 |
| 100% Modulus, psi | 380 | 320 | 350 |
| 300% Modulus, psi | 1765 | 1445 | 1635 |

Also in natural rubber compounds the retarder of the invention is less effective then CTP which is the commercial standard for these compounds. The compound presented below contained in addition to the tabulated components the following additives: carbon black (N-330)—55 phr; zinc oxide—5 phr; Sundex 8125—3 phr; stearic acid—2.5 phr; Sunolite 240—1 phr; Vulkanox 4020—2 phr; Vulkanox HS/LG-1.5 phr; none of which is believed to be critical in demonstrating the relative efficacy of the retarders.

| FORMULATION | CONTROL | 1 | 2 |
|---|---|---|---|
| Natural rubber (SMR-L) | 100 | 100 | 100 |
| Insoluble Sulfur | 2.75 | 2.75 | 2.75 |
| MSB | 0.5 | 0.5 | 0.5 |
| Tolyltriazole | — | 1 | — |
| CTP | — | — | 0.5 |
| COMPOUND PROPERTIES | | | |
| ML1 + 4' @ 100° C. | 74 | 76 | 72 |
| MS5 @ 121° C. (min) | 31.0 | 43.5 | 84.8 |
| RHEOMETER @ 150° C. | | | |
| T2 (min) | 4.6 | 5.0 | 11.5 |
| T90 (min) | 18.8 | 22.4 | 26.5 |
| Torque, Min. (in-lb) | 15 | 16 | 15 |
| Torque, Max. (in-lb) | 68 | 62 | 66 |
| PHYSICAL PROPERTIES | | | |
| Cured at 150° C. for | 20 min | 25 min | 30 min |
| Hardness, Shore A | 65 | 62 | 60 |
| Tensile Strength, psi | 3335 | 3330 | 3345 |
| Elongation, (%) | 490 | 530 | 495 |
| 100% Modulus, psi | 380 | 330 | 360 |
| 300% Modulus, psi | 1895 | 1640 | 1835 |

The following demonstrates the efficacy of the retarder of the invention in bromobutyl rubber, using a ZnO/Sulfur cure system. The Table contains a comparison between the retarder of the invention on the one hand and CTP and MBTS (mercapto benzothiazole disulfide) on the other.

Each of the compositions contained also the following: 65 phr of carbon black (N-660); 3 phr of zinc oxide; 0.5 phr of sulfur; 1 phr—stearic acid; 12 phr—Sunpar 2280 and 0.5 phr—Maglite D, which are believed to have no effect on the demonstrated relative efficacy of the retarders.

| FORMULATION | CONTROL | 1 | 2 | 3 | 4 |
|---|---|---|---|---|---|
| Bromobutyl Rubber | 100 | 100 | 100 | 100 | 100 |
| MBTS | — | — | — | 1 | — |
| Tolyltriazole | — | 0.5 | 1 | — | — |
| CTP | — | — | — | — | 0.5 |
| COMPOUND PROPERTIES | | | | | |
| ML1 + 4' @ 100° C. | 64 | 68 | 64 | 64 | 66 |
| MS5 @ 135° C. (min) | 8.9 | 11.5 | 12.0 | 14.4 | 8.4 |
| RHEOMETER @ 177° C. (60 min chart) | | | | | |
| T2 (min) | 4.0 | 4.4 | 5.4 | 6.0 | 3.5 |
| T90 (min) | 26.3 | 23.9 | 27.5 | 33.0 | 30.5 |
| Torque, Min. (lb-in) | 15 | 14 | 14 | 15 | 14 |
| Torque, Max. (lb-in) | 54 | 55 | 54 | 49 | 50 |
| PHYSICAL PROPERTIES | | | | | |
| Cure time at 177° C. (min): | 23 | 21 | 21 | 24 | 25 |
| Hardness, Shore A | 59 | 59 | 58 | 58 | 57 |
| Tensile strength, psi | 2045 | 2045 | 2070 | 1930 | 2055 |
| Elongation, (%) | 380 | 410 | 420 | 495 | 455 |
| 100% Modulus, psi | 330 | 350 | 335 | 285 | 300 |
| 300% Modulus, psi | 1665 | 1575 | 1610 | 1335 | 1445 |

A corresponding showing in the context of chlorobutyl rubber is shown below. This system too used a ZnO/Sulfur cure system The compounds also contained 65 phr of carbon black; 3 phr of zinc oxide; 0.5 phr of sulfur; 1 phr of stearic acid and 12 phr of Sunpar 2280 which are believed to have no criticality in the showing of the relative efficacy of the retarder of the invention.

| FORMULATION | CONTROL | 1 | 2 | 3 |
|---|---|---|---|---|
| Chlorobutyl Rubber | 100 | 100 | 100 | 100 |
| Tolyltriazole | — | 0.5 | — | — |
| Magnesium Oxide | — | — | 0.5 | — |
| CTP | — | — | — | 0.5 |
| COMPOUND PROPERTIES | | | | |
| ML1 + 4' @ 100° C. | 60 | 58 | 58 | 58 |
| MS5 @ 135° C. (min) | 21.2 | 63.2 | 63.5 | 35.0 |
| RHEOMETER @ 177° C. | | | | |
| T2 (min) | 2.0 | 3.1 | 6.2 | 2.5 |
| T90 (min) | 6.6 | 13.0 | 29.0 | 17.5 |
| Torque, Min. (lb-in) | 11 | 10 | 11 | 10 |
| Torque, Max. (lb-in) | 32 | 33 | 36 | 32 |
| PHYSICAL PROPERTIES (Cured to T90 @ 177° C.) | | | | |
| Hardness, Shore A | 52 | 53 | 54 | 53 |
| Tensile Strength, psi | 1620 | 1755 | 1700 | 1690 |
| Elongation (%) | 520 | 570 | 440 | 580 |
| 100% Modulus, psi | 195 | 205 | 250 | 190 |
| 300% Modulus, psi | 925 | 900 | 1130 | 845 |

In the following Tables there is demonstrated the efficacy of tolyltriazole as a retarding agent in variously cured chlorobutyl rubbers. The Tables also contain a comparison between the retarder of the invention and other known retarders. The cure system in the Table below is ZnO/alkylphenol disulfide/sulfur.

The compositions also contained 65 phr of carbon black; 3 phr of zinc oxide; 0.5 phr of sulfur and 1 phr of Vultac 5; 1 phr of stearic acid and 12 phr of Sunpar 2280 which are believed to have no criticality in the present context.

| FORMULATION | CONTROL | 1 | 2 | 3 | 4 |
|---|---|---|---|---|---|
| Chlorobutyl Rubber | 100 | 100 | 100 | 100 | 100 |
| MBTS | — | 1 | — | — | — |
| Magnesium Oxide | — | — | 0.5 | — | — |
| Tolyltriazole | — | — | — | 0.5 | 1 |
| COMPOUND PROPERTIES | | | | | |
| ML1 + 4' @ 100° C. | 58 | 59 | 60 | 58 | 59 |
| MS5 @ 135° C. (min) | 5.2 | 9.5 | 9.5 | 10.0 | 12.5 |
| RHEOMETER @ 177° C. | | | | | |
| T2 (min) | 1.4 | 1.9 | 2.8 | 2.0 | 2.4 |
| T90 (min) | 9.2 | 9.0 | 20.6 | 11.4 | 13.0 |
| Torque, Min. (lb-in) | 11 | 11 | 11 | 11 | 11 |
| Torque, Max. (lb-in) | 46 | 43 | 51 | 47 | 47 |
| PHYSICAL PROPERTIES (Cured to T90 @ 177° C.) | | | | | |
| Hardness, Shore A | 56 | 58 | 58 | 56 | 58 |
| Tensile Strength, psi | 1885 | 1735 | 1855 | 1880 | 1865 |
| Elongation (%) | 450 | 550 | 385 | 485 | 455 |
| 100% Modulus, psi | 300 | 270 | 370 | 265 | 310 |
| 300% Modulus, psi | 1365 | 1100 | 1560 | 1240 | 1330 |

A similar comparison is presented below for chlorobutyl rubber where the cure system is ZnO/Sulfur/MBTS.

The compositions also contain 65 phr of carbon black (N-660); 3 phr of zinc oxide; 0.5 phr of sulfur; 1 phr of MBTS; 1 phr of stearic acid and 12 phr of Sunpar 2280 which re believed to have no criticality in the context of the invention.

| FORMULATION | CONTROL | 1 | 2 | 3 |
|---|---|---|---|---|
| Chlorobutyl Rubber | 100 | 100 | 100 | 100 |
| Magnesium Oxide | — | 0.5 | — | — |
| Tolyltriazole | — | — | 0.5 | 1 |
| COMPOUND PROPERTIES | | | | |
| ML1 + 4' @ 100° C. | 55 | 57 | 56 | 55 |
| MS5 @ 135° C. (min) | 18.8 | 56.8 | 35.3 | 61.5 |
| RHEOMETER @ 177° C. | | | | |
| T2 (min) | 2.5 | 4.5 | 3.3 | 4.7 |
| T80 (min) | 6.6 | 11.6 | 7.4 | 9.2 |
| T90 (min) | 13.1 | 13.6 | 10.0 | 10.6 |
| Torque, Min. (lb-in) | 11 | 11 | 11 | 10 |
| Torque, Max. (lb-in) | 33 | 36 | 33 | 33 |
| PHYSICAL PROPERTIES (cured to T90 @ 177° C.) | | | | |
| Hardness, Shore A | 53 | 54 | 55 | 55 |
| Tensile Strength, psi | 1600 | 1695 | 1610 | 1675 |
| Elongation, (%) | 610 | 555 | 650 | 640 |
| 100% Modulus, psi | 185 | 190 | 180 | 185 |
| 300% Modulus, psi | 810 | 905 | 780 | 790 |

In the following Table the comparison is based on chlorobutyl rubber where the cure system is ZnO/Sulfur/alkylphenol disulfide/MBTS.

The compositions also contain 65 phr of carbon black (N-660); 3 phr of zinc oxide; 0.5 phr of sulfur; 1 phr of alkyl phenol disulfide; 1 phr of MBTS; 1 phr of stearic acid and 12 phr of Sunpar 2280 which are believed to have no criticality in the context of the invention.

| FORMULATION | CONTROL | 1 | 2 | 3 |
|---|---|---|---|---|
| Chlorobutyl Rubber | 100 | 100 | 100 | 100 |
| Magnesium Oxide | — | 0.5 | — | — |
| Tolyltriazole | — | — | 0.5 | — |
| CTP | — | — | — | 0.5 |
| COMPOUND PROPERTIES | | | | |
| ML1 + 4' @ 100° C. | 58 | 58 | 58 | 59 |
| MS5 @ 135° C. (min) | 10.2 | 15.0 | 13.0 | 11.9 |
| RHEOMETER @ 177° C. | | | | |

-continued

| FORMULATION | CONTROL | 1 | 2 | 3 |
|---|---|---|---|---|
| T2 (min) | 1.8 | 2.7 | 2.2 | 2.1 |
| T90 (min) | 7.0 | 13.0 | 7.6 | 12.0 |
| Torque, Min. (lb-in) | 12 | 12 | 11 | 10 |
| Torque, Mix. (lb-in) | 44 | 49 | 43 | 39 |
| PHYSICAL PROPERTIES (Cured to T90 at 177° C.) | | | | |
| Hardness, Shore A | 57 | 55 | 57 | 57 |
| Tensile Strength, psi | 1690 | 1785 | 1710 | 1640 |
| Elongation (%) | 620 | 510 | 585 | 600 |
| 100% Modulus, psi | 230 | 285 | 240 | 245 |
| 300% Modulus, psi | 975 | 1215 | 1005 | 935 |

The following table summarizes the evaluation of the properties of a chlorobutyl rubber compound which contains no retarder to similar compounds which contain either benzotriazole or tolyltriazole. The compound described below contained also 1 phr of stearic acid, 65 phr of carbon black (N-660); 12 phr of Sunpar 2280; 3 phr of zinc oxide; and 0.5 phr of sulfur.

| FORMULATION | 1 | 2 | 3 |
|---|---|---|---|
| Chlorobutyl rubber, phr | 100 | 100 | 100 |
| Tolyltriazole | — | 0.5 | — |
| Benzotriazole | — | — | 0.5 |
| COMPOUND PROPERTIES | | | |
| ML 1 + 4' @ 100° C. | 56 | 57 | 56 |
| MS 5 @ 135° C.(min) | 29.0 | 60.5 | 62.0 |
| RHEOMETER @ 177° C. | | | |
| T2 (min) | 2.0 | 3.1 | 3.1 |
| T90 (min) | 8.1 | 10.4 | 11.4 |
| MIN. TORQUE (lb-in) | 10 | 10 | 10 |
| MAX. TORQUE (lb-in) | 31 | 32 | 35 |
| PHYSICAL PROPERTIES CURED T90 @ 177 C. | | | |
| HARDNESS (SHORE A) | 51 | 51 | 54 |
| TENSILE (psi) | 1565 | 1590 | 1680 |
| ELONGATION (%) | 535 | 545 | 480 |
| 100% MOD. (psi) | 175 | 195 | 230 |
| 300% MOD. (psi) | 810 | 845 | 1045 |

The above data shows that the scorch resistance of halogenated butyl rubber is significantly improved by the practice of the present invention. The incorporation of the claimed triazoles in halogenated butyl rubber in sufficient amount to reduce scorch does not adversely effect the mechanical properties of the compounds.

The following demonstrates that the addition of tolyltriazole retarder to bromobutyl rubber or to chlorobutyl rubber, does not adversely affect the heat aging or flex cracking of these rubbers. The bromobutyl rubber compound contained in the following components (the amounts are noted per 100 weight of rubber—phr); stearic acid—1 phr; N660 carbon black—65 phr; Sunpar 2280—12 phr; Maglite D—0.5 phr; Zinc oxide—3 phr; spider sulfur—0.5 phr. The chlorobutyl rubber contained the following: Stearic acid—1 phr; N660 carbon black—65 phr; Sunpar 2280—12 phr; Zinc oxide—3 phr; Sulfur spider—0.5 phr.

The Tables below show a comparison between the properties of these rubber systems containing tolyltriazole and similar systems containing other, known retarders. Table A is directed to bromobutyl rubber and Table B is directed to chlorobutyl rubber.

TABLE A

| | | | | | |
|---|---|---|---|---|---|
| Tolyltriazole | — | 0.5 | 1.0 | — | — |
| MBTS | — | — | — | 1.0 | — |
| CTP | — | — | — | — | 0.5 |
| Physical Properties (T90 @ 177° C.) | | | | | |
| Hardness (Shore A) | 59 | 59 | 58 | 58 | 57 |
| Tensile Strength (psi) | 2045 | 2045 | 2070 | 1930 | 2055 |
| Elongation (%) | 380 | 410 | 420 | 495 | 445 |
| 300% Modulus (psi) | 1665 | 1575 | 1610 | 1335 | 1445 |
| Hot Air Aging: 3d* @ 135° C. | | | | | |
| Hardness Change (Shore A) | 0 | −1 | −1 | +4 | +2 |
| Tensile Retention (%) | 69 | 68 | 65 | 82 | 68 |
| Elongation Retention (%) | 111 | 113 | 119 | 91 | 96 |
| 300% Mod. Retention (%) | 68 | 65 | 61 | 93 | 77 |
| Hot Air Aging: 7d* @ 100° C. | | | | | |
| Hardness Change (Shore A) | +2 | +2 | +4 | +3 | +5 |
| Tensile Retention (%) | 88 | 86 | 84 | 89 | 85 |
| Elongation Retention (%) | 81 | 83 | 80 | 75 | 74 |
| 300% Mod. Retention (%) | 105 | 102 | 104 | 116 | 116 |
| DeMattia - Crack Growth** (% Cracking) Unaged (kc***) | | | | | |
| 1 | 9 | 9 | 9 | 7 | 8 |
| 6 | 27 | 18 | 22 | 13 | 20 |
| 10 | 37 | 34 | 30 | 20 | 25 |
| 20 | 50 | 50 | 43 | 30 | 40 |
| 40 | 84 | 80 | 72 | 60 | 65 |
| 100 | 100 | 100 | 98 | 90 | 100 |
| Hot Air: 7d @ 100° C. (kc) | | | | | |
| 1 | 14 | 10 | 12 | 12 | 12 |
| 6 | 43 | 27 | 33 | 37 | 31 |
| 10 | 59 | 36 | 43 | 49 | 37 |
| 20 | 84 | 53 | 65 | 73 | 54 |
| 40 | 96 | 73 | 86 | 92 | 73 |
| 70 | 100 | 87 | 98 | 100 | 82 |

*d-days
**per ASTM D-813
***kilocycles

TABLE B

| | | | | |
|---|---|---|---|---|
| MBTS | 1.0 | 1.0 | 1.0 | 1.0 |
| Tolyltriazole | — | 0.5 | 1.0 | — |
| Magnesium Oxide | — | — | — | 0.5 |
| Physical Properties (T90 @ 177° C.) | | | | |
| Hardness (Shore A) | 53 | 55 | 55 | 54 |
| Tensile Strength (psi) | 1600 | 1610 | 1645 | 1695 |
| Elongation (%) | 610 | 650 | 640 | 555 |
| 300% Modulus (psi) | 810 | 780 | 790 | 905 |
| Hot Air Aging: 5d* @ 135° C. | | | | |
| Hardness Change (Shore A) | +4 | +3 | +5 | +6 |
| Tensile Retention (%) | 79 | 79 | 78 | 82 |
| Elongation Retention (%) | 64 | 61 | 64 | 68 |
| 300% Mod. Retention (%) | 128 | 135 | 134 | 133 |
| Hot Air Aging: 7d* @ 100° C. | | | | |
| Hardness Change (Shore A) | +2 | +2 | +3 | +6 |
| Tensile Retention (%) | 99 | 99 | 91 | 99 |
| Elongation Retention (%) | 77 | 75 | 70 | 75 |
| 300% Mod. Retention (%) | 128 | 131 | 133 | 143 |
| DeMattia - Crack Growth** (% Cracking) Unaged (kc)*** | | | | |
| 10 | | 10 | 8 | 9 | 10 |
| 50 | 20 | 10 | 11 | 14 |
| 100 | 35 | 15 | 14 | 28 |
| 200 | 52 | 22 | 26 | 40 |
| 400 | 74 | 42 | 42 | 58 |
| 500 | 90 | 52 | 52 | 66 |
| Hot Air: 7d* @ 100° C.(kc) | | | | |
| 10 | 15 | 11 | 16 | 14 |
| 50 | 38 | 20 | 34 | 35 |
| 100 | 56 | 38 | 52 | 57 |
| 200 | 78 | 69 | 74 | 86 |
| 250 | 89 | 75 | 84 | 92 |

*d-days
**per ASTM D-813
***kilocycles

In the preferred embodiment of the invention, the triazole is added to the halogenated butyl rubber by mixing in a suitable mixer. Such mixing may be carried out simultaneously with the other conventional additives or it can be incorporated in the rubber either before, during or after the addition of the normal compounding ingredients. The triazole should be introduced into the compound at an effective amount to achieve the desired stabilization.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A vulcanizable composition comprising a halogenated butyl rubber compound and a sufficient amount of triazole to retard the scorch of said composition, said triazole conforming to

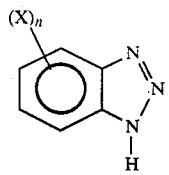

wherein
X is a $C_1$–$C_6$ alkyl and
n is 0 to 4.

2. The composition of claim 1 wherein said sufficient amount is 0.1 to about 5.0 parts per 100 parts of rubber.

3. The composition of claim 1 wherein said triazole conforms to

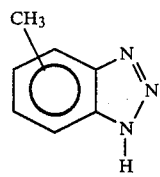

4. The composition of claim 1 wherein said halogenated butyl rubber is brominated.

5. The composition of claim 1 wherein said halogenated butyl rubber is chlorinated.

6. The composition of claim 1 wherein said butyl rubber is a copolymer of 85 to 99.5% of $C_4$–$C_8$ isoolefin and 0.5 to 15% of conjugated $C_4$–$C_8$ diolefin.

7. The composition of claim 1 wherein said butyl rubber is a copolymer of 95.5%–98.5% isobutylene and 1.5–4.5% of isoprene.

8. A method for retarding the scorch of a vulcanizable halogenated butyl rubber compound comprising admixing with said compound an amount of triazole conforming to the formula

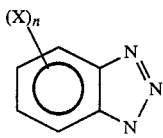

wherein
X is a $C_1$–$C_6$ alkyl and
n denotes an integer from 0 to 4
said amount being sufficient to reduce the scorch of said rubber.

9. The method of claim 8 wherein said amount is about 0.1 to about 5.0 parts per 100 parts of said rubber.

10. The method of claim 8 wherein said butyl rubber is a copolymer of 95.5–98.5% isobutylene and 1.5–4.5% isoprene.

11. The method of claim 8 wherein said triazole conforms to

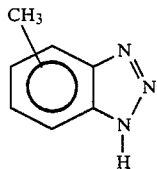

* * * * *